(12) United States Patent
Subramanian et al.

(10) Patent No.: US 8,649,379 B2
(45) Date of Patent: Feb. 11, 2014

(54) METHOD AND APPARATUS FOR CONFIGURING A LINK AGGREGATION GROUP ON A STACKED SWITCH

(75) Inventors: Krishnamurthy Subramanian, Mountain View, CA (US); Janardhanan P. Narasimhan, Chennai (IN)

(73) Assignee: Force10 Networks, Inc., San Jose, CA (US)

( * ) Notice: Subject to any disclaimer, the term of this patent is extended or adjusted under 35 U.S.C. 154(b) by 162 days.

(21) Appl. No.: 13/048,281

(22) Filed: Mar. 15, 2011

(65) Prior Publication Data

US 2012/0236859 A1 Sep. 20, 2012

(51) Int. Cl.
*H04L 12/28* (2006.01)
(52) U.S. Cl.
USPC .......................................... 370/392; 370/389

(58) Field of Classification Search
USPC .......................................... 370/392, 401, 352
See application file for complete search history.

(56) References Cited

U.S. PATENT DOCUMENTS

| | | | | |
|---|---|---|---|---|
| 6,910,149 B2 * | 6/2005 | Perloff et al. | .................. | 714/4.3 |
| 7,308,612 B1 * | 12/2007 | Bishara | ........................... | 714/43 |
| 7,613,201 B1 * | 11/2009 | Yang et al. | ..................... | 370/437 |
| 2002/0131437 A1 * | 9/2002 | Tagore-Brage | ............... | 370/419 |
| 2007/0280258 A1 * | 12/2007 | Rajagopalan et al. | ...... | 370/395.3 |
| 2008/0301319 A1 * | 12/2008 | Dernosek et al. | ............ | 709/232 |
| 2010/0284416 A1 * | 11/2010 | Aoshima | ....................... | 370/401 |

* cited by examiner

*Primary Examiner* — Hassan Phillips
*Assistant Examiner* — Siren Wei
(74) *Attorney, Agent, or Firm* — Haynes and Boone, LLP

(57) ABSTRACT

Two network switches are configured in a stacked relationship to each other and include link aggregation sub-layer functionality. Switching tables are programmed on each switch with information used to forward packets ingressing to them over a redundant LAG that is identified in the switching table by a port that is a member of the redundant LAG.

14 Claims, 8 Drawing Sheets

FIG. 4B

ROUTING INFORMATION BASE

MAC TABLE

| MAC DA | VLAN ID | EGRESS PORT | OTHER |
|---|---|---|---|
| AA:...:AA | 100 | LAG-10 | |
| BB:...:BB | 100 | LAG-20 | |
| ... | ... | ... | |
| XX:...:XX | XXX | LAG-XX | |

LAG TABLE

| LAG ID | MEMBERS | PORT LIST | AGGREGATOR ID |
|---|---|---|---|
| 10 | 2 | 10, 40 | X |
| 20 | 2 | 20, 50 | X |
| ... | ... | ... | ... |
| LAGn | X | X, Y | X |

FIG. 4C

SWITCHING TABLE

| MAC DA | VLAN ID | EGRESS PORT |
|---|---|---|
| AA:...:AA | 100 | LAG-10 |
| BB:...:BB | 100 | LAG-20 |
| ... | ... | ... |
| XX:...:XX | XXX | LAG-XX |

MAC TABLE

| LAG ID | MEMBERS | PORT LIST |
|---|---|---|
| 10 | 2 | 10, 40 |
| 20 | 2 | 20, 50 |
| ... | ... | ... |
| LAGn | X | X, Y |

LAG TABLE

FIG. 5A

SWITCHING TABLE 500

MAC TABLE

| MAC DA | VLAN.ID | EGRESS PORT |
|---|---|---|
| AA:....:AA | 100 | 10 |
| BB:....:BB | 100 | 20 |
| CC:....:CC | 200 | LAG-30 |
| ... | ... | ... |
| XX:....:XX | XXX | LAG-XX |

LAG TABLE

| LAG.ID | MEMBERS | PORT LIST |
|---|---|---|
| ---- | ---- | ---- |

FIG. 5B

SWITCHING TABLE 501

| MAC DA | VLAN.ID | EGRESS PORT |
|---|---|---|
| AA:...:AA | 100 | 40 |
| BB:...:BB | 100 | 50 |
| CC:...:CC | 200 | LAG-30 |
| ... | ... | ... |
| XX:...:XX | XXX | LAG-XX |

MAC TABLE

| LAG.ID | MEMBERS | PORT LIST |
|---|---|---|
| --- | --- | --- |

LAG TABLE

METHOD AND APPARATUS FOR CONFIGURING A LINK AGGREGATION GROUP ON A STACKED SWITCH

BACKGROUND

1. Field of the Invention

The present disclosure relates generally to packet network devices such as switches, and more particularly to methods for configuring and controlling the operation of a Link Aggregation Group on two or more switches that are connected together in a stacked arrangement.

2. Description of Related Art

Link aggregation refers to a process for operating a group of physical links as if they were a single link. At least one standard for link aggregation has been promulgated by the Institute of Electrical and Electronic Engineers, e.g., in the IEEE 802.1AX-2008 standard, incorporated herein by reference.

There are a number of motivations for implementing Link Aggregation on network switches. One motivation for implementing Link Aggregation is to increase bandwidth by combining the capacity of multiple physical links together into one logical link. FIG. 1 shows two network switches, switch 100 and switch 102, connected to each other by four physical links, Links 1-4. If each of the physical links can support network traffic at a rate of 10 Mb/s, then configuring the four physical links as a single, logical link can result in a combined link bandwidth of up to 40 Mb/s. The single, logical link is referred to as a Link Aggregation Group (LAG.

Another motivation for implementing Link Aggregation in network switches is to provide link redundancy. In the event that a physical link between two network switches fails, the flow of network traffic assigned to this link can be interrupted with the loss of some or all of the packets in the flow. Referring again to FIG. 1, if link 1 fails, some or all of the traffic that was being transmitted over this physical link can be transmitted over links 2-4 subsequent to the failure of link 1.

Some basic link aggregation terminology and concepts from the IEEE 802.1-2008 standard are useful to the understanding of the embodiments. Referring to FIG. 2, several logical components of a packet network device (switch) 200 are shown, including a Media Access Control (MAC) client 210, a link aggregation sublayer 220, four individual MACs MAC1-MAC4, and four individual physical layer transponders (PHYs) PHY1-PHY4. The purpose of the link aggregation sublayer 220 is to combine a number of physical ports (represented by MACn/PHYn) logically for presentation to MAC client 210 as a single logical MAC. More or less than four physical ports are supportable by the framework, with up to the same number of MAC clients as physical ports supportable as well.

Link aggregation sublayer 220 is further subdivided into several logical components, including control parser/multiplexers (muxes) CPM1-CPM4, an aggregator 230, and aggregation control 260. Each control parser/mux CPMn couples to a corresponding MAC MACn across an IEEE 802.3 MAC service interface. For egress frames (transmitted by one of the PHYs), each control parser/mux passes frame transmission requests from aggregator 230 and aggregation control 260 to the appropriate port. For ingress frames (received by one of the PHYs), each control parser/mux distinguishes Link Aggregation Control (LAC) Protocol Data Units (PDUs) from other frames, and passes the LACPDUs to aggregation control 260, with all other frames passing to aggregator 230. It is noted that although one aggregator 230 is shown, in the particular implementation shown in FIG. 2 there could be up to four aggregators—each control parser/mux CPMn passes its non-LACPDU ingress traffic to a particular aggregator bound to MACn, or discards the non-LACPDU traffic when MACn is not bound to an aggregator.

Aggregator 230 comprises a frame collection block 240, a frame distribution block 250, and up to four (in this embodiment) aggregator parser/muxes APM1-APM4. Aggregator 230 communicates with MAC client 210 across an IEEE 802.3 MAC service interface. Aggregator 230 also communicates with each control parser/mux CPMn that corresponds to a MAC MACn bound to aggregator 230.

Frame collection block 240 comprises a frame collector 242 and a marker responder 244. The frame collector 242 receives ordinary traffic frames from each bound MAC MACn and passes these frames to MAC client 210. Frame collector 242 is not constrained as to how it multiplexes frames from its bound ports, other than it is not allowed to reorder frames received on any one port. The marker responder 244 receives marker frames (as defined in IEEE 802.3-2005) from each bound port and responds with a return marker frame to the port that received the ingress marker frame.

Frame distribution block 250 comprises a frame distributor 252 and an optional marker generator/receiver 254. The frame distributor 252 receives ordinary traffic frames from MAC client 210, and employs a frame distribution algorithm to distribute the frames among the ports bound to the aggregator. Frame distributor 252 is not constrained as to how it distributes frames to its bound ports, other than that it is expected to supply frames from the same "conversation" to the same egress port. Marker generator/receiver 254 can be used, e.g., to aid in switching a conversation from one egress port to another egress port. Frame distribution 250 holds or discards any incoming frames for the conversation while marker generator/receiver 254 generates a marker frame on the port handling the conversation. When a return marker frame is received, all in-transit frames for the conversation have been received at the far end of the aggregated link, and frame distribution may switch the conversation to a new egress port.

Aggregator parser/muxes APM1-APM4, when bound to one of the physical ports, transfer frames with their corresponding control parser/mux CPM1-CPM4. On transmit, aggregator parser/muxes APM1-APM4 takes egress frames (ordinary traffic and marker frames) from frame distribution 250 and marker responder 244 and supply them to their respective bound ports. For ingress frames received from their bound port, each aggregator parser/mux distinguishes ordinary MAC traffic, marker request frames, and marker response frames, passing each to frame collector 242, marker responder 244, and marker generator/receiver 254, respectively.

Aggregation control 260 is responsible for configuration and control of link aggregation for its assigned physical ports. Aggregation control 260 comprises a link aggregation control protocol (LACP) handler 262 that is used for automatic communication of aggregation capabilities and status among systems, and a link aggregation controller 264 that allows automatic control of aggregation and coordination with other systems. The aggregation control 260 also functions to maintain per link information in forwarding tables on each of the line cards comprising a switch. This information can include such things as the identity of a LAG to which the link belongs, the identity of the aggregator to which the LAG belongs, and the status of interaction between the frame collection function or the frame distribution function of the aggregator and the link. More specifically, the aggregation control 260 communicates the state information to an aggregator on a line card, and the aggregator on the line card uses this information to maintain information in the forwarding tables necessary to forward network information over a LAG. The aggregation control 260 also receives information from a layer-2 protocol (OSPF for instance) running in the control module relating to the state of each link assigned to the LAG. So, in the event that one link assigned to the LAG fails, the control 260 becomes aware of this failure and communicates this to the aggregator which then reprograms the forwarding tables accordingly.

The frames exchanged between LACP 262 and its counterparts in peer systems each contain a LAC PDU (Protocol Data Unit), e.g., with a format 300 as shown in FIG. 3. The actor information and partner information contained in the LACPDU structure are used to establish and break link aggregations, with the "actor information" pertaining to the system sending the LACPDU, and the "partner information" indicating the state of the system receiving the LACPDU, as understood by the system sending the LACPDU.

The actor and partner information include a system ID, system priority, key, port ID, port priority, and state flags. The system ID is a globally unique identifier such as a MAC address assigned to the system. The system priority is a priority value assigned by the system administrator to the system. The key is a value assigned to the port by its system, and may be static or dynamic. The key is the same for each port on the system that is capable of aggregation with other ports transmitting that key. The port ID is a port number assigned by the system administrator to each port, and should be unique on the system. The port priority is a priority value assigned by the system administrator to the port, and should be unique among ports that are potentially aggregable. The state flags include LACP_Activity, LACP_Timeout, Aggregation, Synchronization, Collecting, Distributing, Defaulted, and Expired, and are defined as specified in IEEE 802.3-2005. In particular, the Synchronization bit is set TRUE when the link has been allocated to the correct Link Aggregation Group (LAG), the group has been associated with a compatible Aggregator, and the identity of the LAG is consistent with the System ID and Key transmitted by the port.

In operation, peered systems exchange LACPDUs to determine whether multiple ports that are aggregable to each other appear on both ends of the same link. To accomplish this, both endpoints calculate a Link Aggregation Group Identifier (LAG ID) for each participating port. The LAG ID combines actor and partner system priorities, system IDs, and keys. When the LAG IDs on two or more aggregable ports match, those ports are automatically assigned to the same LAG group, as long as both link endpoint systems make the aggregation.

Single chassis packet switches, similar to the switch 200 described above with reference to FIG. 2, can only support a limited number of line cards and ports. Some vendors provide special link cards or a "back-end" port that can be used to connect or stack two separate switches together to form a stacked system that in at least some ways acts with peer devices like a single larger chassis. With two chassis stacked in this manner, when a packet arrives at one of the switches that must egress on the other switch, instead of processing the packet normally the first switch places the packet in a special proprietary wrapper and hands the packet off to the other switch using the proprietary connection. The second switch reads the wrapper, removes it, and processes the packet.

U.S. patent application Ser. No. 12/828,514 entitled "Multiple Chassis Stacking using Front-End Ports" which was filed Jul. 1, 2010 and assigned to Force 10 Networks, Inc. describes a method and apparatus for creating a single, logical chassis out of two fully functional physical chassis, linked only through their normal front-end traffic ports. A link aggregation group (LAG) with enough member ports to support anticipated cross-platform traffic is set up between the two chassis, and route processing managers on the two chassis negotiate to determine a stack master. The stack master configures line cards on each chassis for appropriate behavior in each traffic situation, as is described in the application. Such behavior generally using the same types of lookup and forwarding operations already employed in single-chassis operation, but with instructions that vary, sometimes per line card, depending on the ingress and egress chassis of a packet. Extra processing is largely avoided, and some unique features such as a single LAG with member ports on both chassis, even further reduce cross-chassis traffic and to reduce the likelihood that the entire stacked system will fail due to the failure of any one line card.

One motivation for connecting two or more network switches in a stacked switch configuration can be to increase the number of ports that can be controlled by a single management/control plane. From the perspective of the packet network, the stacked switches operate as a single, logical switch.

Another motivation for connecting two or more network switches in a stacked configuration is to provide link redundancy to network devices (switches) that are neighbors to the stacked switches. FIG. 3 illustrates a packet network topology comprised of two switches 300 and 302 in a stacked arrangement 308. Each of the stacked switches 300 and 302 are connected to each of two other network switches 304 and 306 by different physical links. Network switch 300 is connected to switch 304 and to switch 306 over links 1 and 3 respectively, and network switch 302 is connect to switch 304 and to switch 306 over links 2 and 4 respectively. In order to provide for link redundancy between each of the network switches 304 and 306, a LAG-A is established between switch 304 and the stacked switches 308 that includes links 1 and 2, and a LAG-B is established between switch 306 and the stacked switches 308 that includes links 3 and 4.

Typically, each network switch is limited in the number of LAGs it can support. This limitation can be different with each switch and is generally determined by the architecture of a device (packet processor) that operates to process network information ingressing to and egressing from the switch. Specifically, packet processors offered by different vendors typically include more or less memory dedicated to storing information used to by the packet processor to forward the network information to its correct destination. Such forwarding information can include, among other things, destination address information, egress port information, VLAN ID information, ingress port information, MAC address information, LAG ID information and LAG membership information. The limitation to the number of LAGs supported by a switch cannot be increased by merely arranging multiple switches in a stacked configuration. The total number of LAGs that can be supported by a stacked switch is not the sum of the number of LAGs that can be supported by each of the switches comprising the stacked switch. For instance, if each of the switches 300 and 302 in FIG. 3 includes 300 ports and can support up to 128 LAGs, then the stacked switch arrangement 308 has a total of 600 ports, but still can only support up to 128 LAGs. Merely adding additional switches to a stacked switch does not result in the stacked switch being able to support additional LAGs beyond the number that any single switch can support. This unfortunately limits the number of redundant links that can be supported in the network topology of FIG. 3. This limitation in the number of LAGs supported by a stacked switch is a particular problem in Data Center architectures, as Top of Row (TOR) switches can connect to two or more core switches using a LAG.

SUMMARY

In certain network configurations, where link redundancy is the primary goal, two or more network switches can be configured to operate as a single, logical (stacked) switch. A link aggregation group (LAG) can be configured on the logical switch such that each one of the network switches comprising the logical switch include a single port that is assigned to be a member of the LAG. Typically, the forwarding tables located in the hardware of each line card are specifically programmed to support the operation of such an LAG. But as mentioned earlier, any particular switch is only able to support the operation of a maximum number of LAGs. Accordingly, it was discovered that it is not necessary to program the switching tables in the hardware to support the operation of a LAG in which each of two switches comprising a stacked switch is assigned a single port of a LAG. Rather, the information associated with such an LAG is configured in software functionality operating to support link aggregation operation. Only including the information associated with this particular type of LAG in software, permits the switch to support more LAGs than is otherwise possible if all of the LAGs are programmed in the hardware tables.

BRIEF DESCRIPTION OF THE DRAWINGS

FIG. 4B is a diagram showing the format of a L2 tables included on a switch.

FIG. 4C is a diagram showing the format of a switching table

FIG. 5 is a diagram of a switch table according on an embodiment.

DETAILED DESCRIPTION

Figure 1:
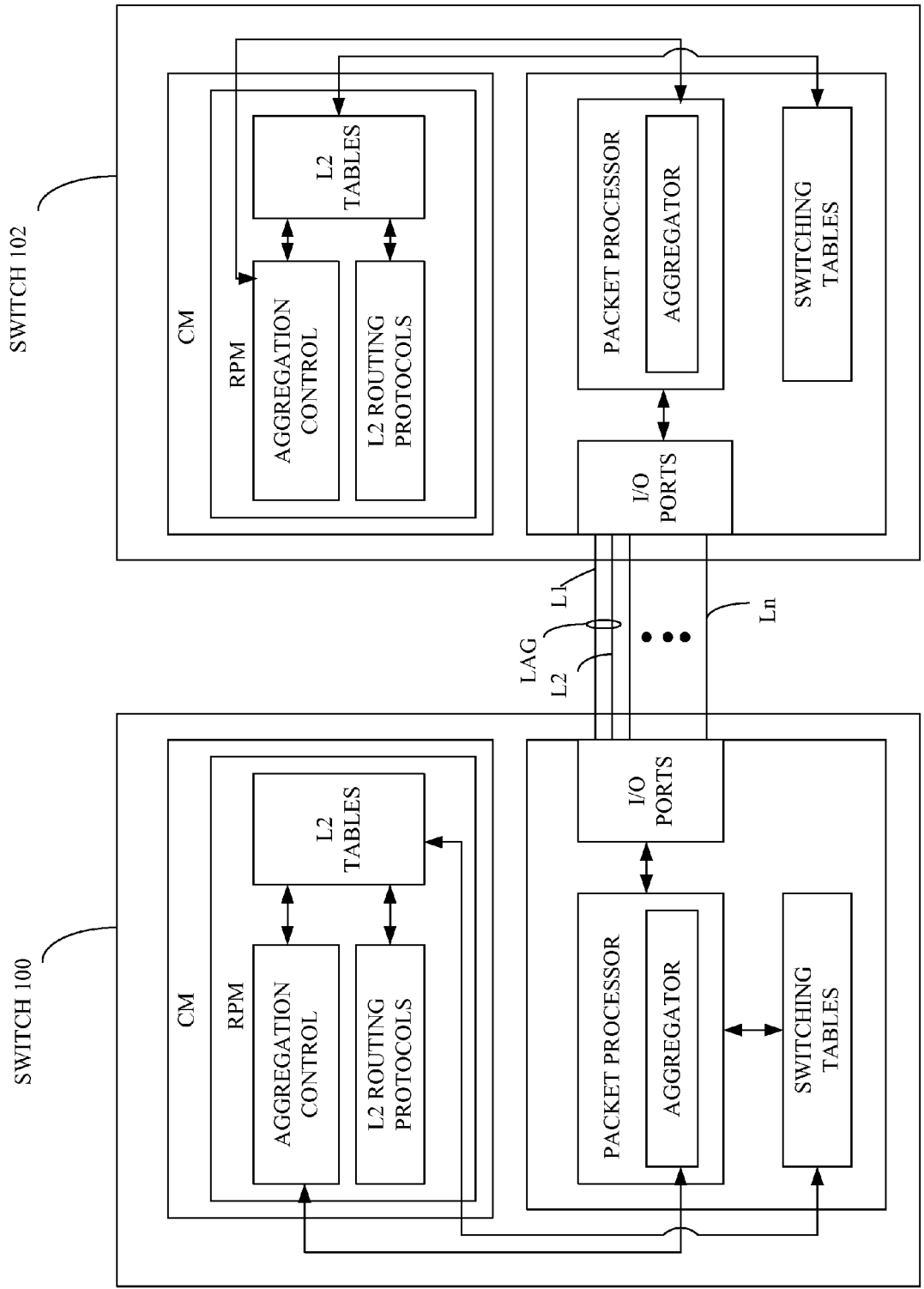
FIG. 1 is a diagram showing two network switches connected to each other over an aggregation of links.
Figure 2:
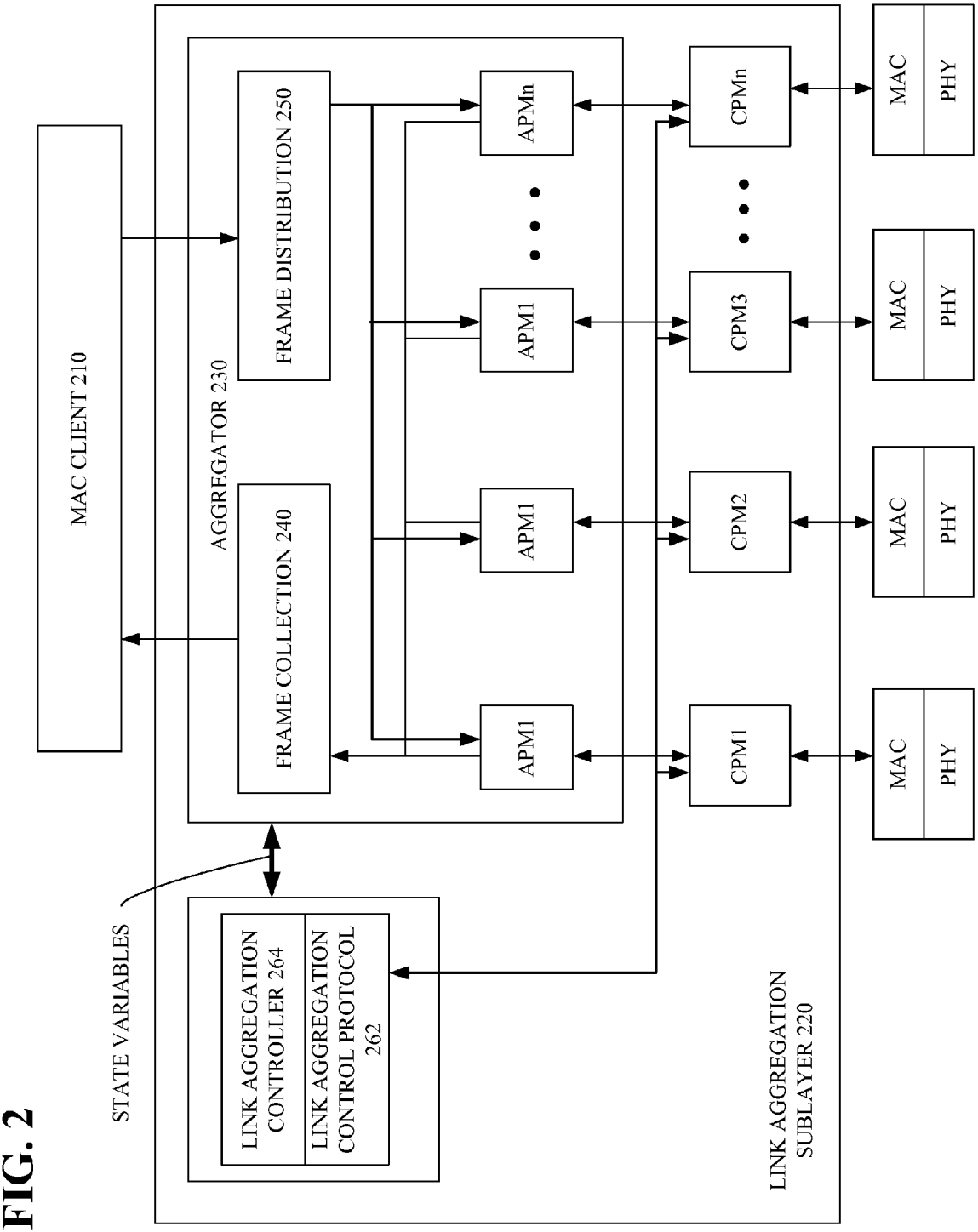
FIG. 2 is a diagram showing functional elements included in a link aggregation sublayer.
Figure 3:
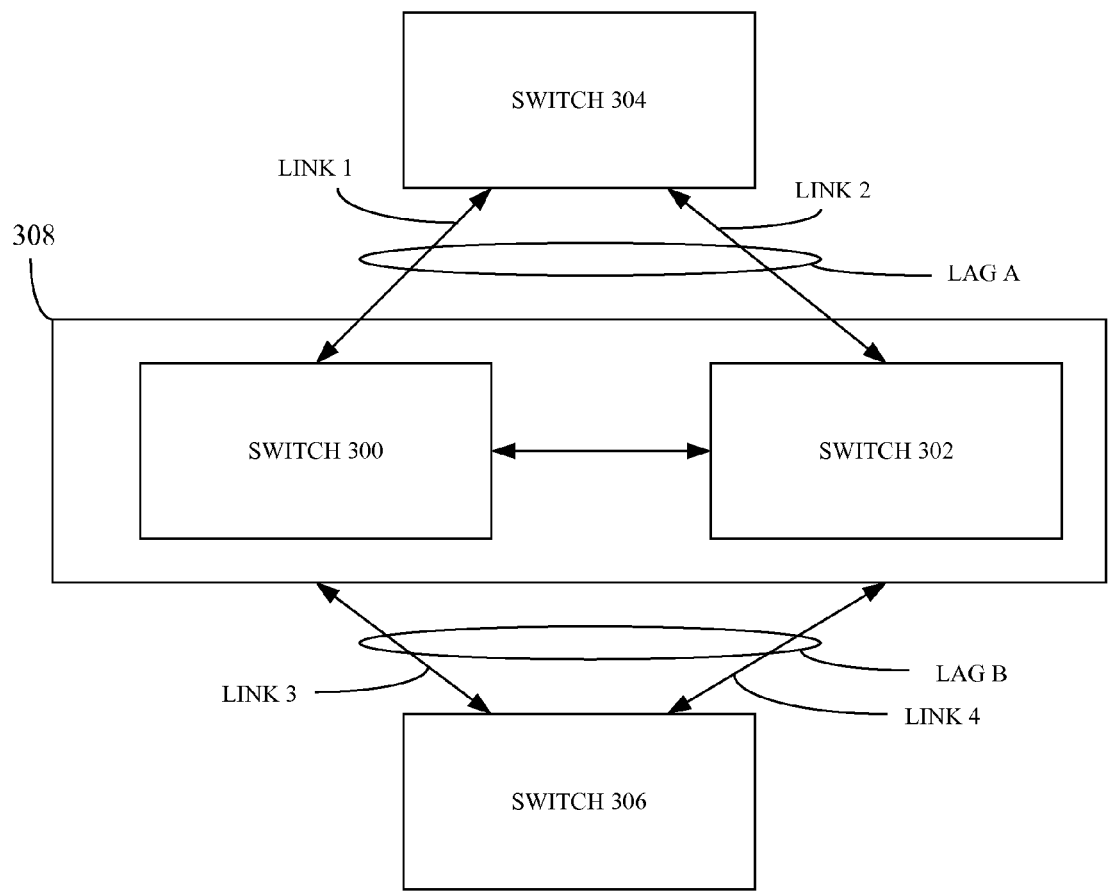
FIG. 3 is a diagram showing two network switches in a stacked configuration linked to two other switches over two LAGs.
Figure 4A:
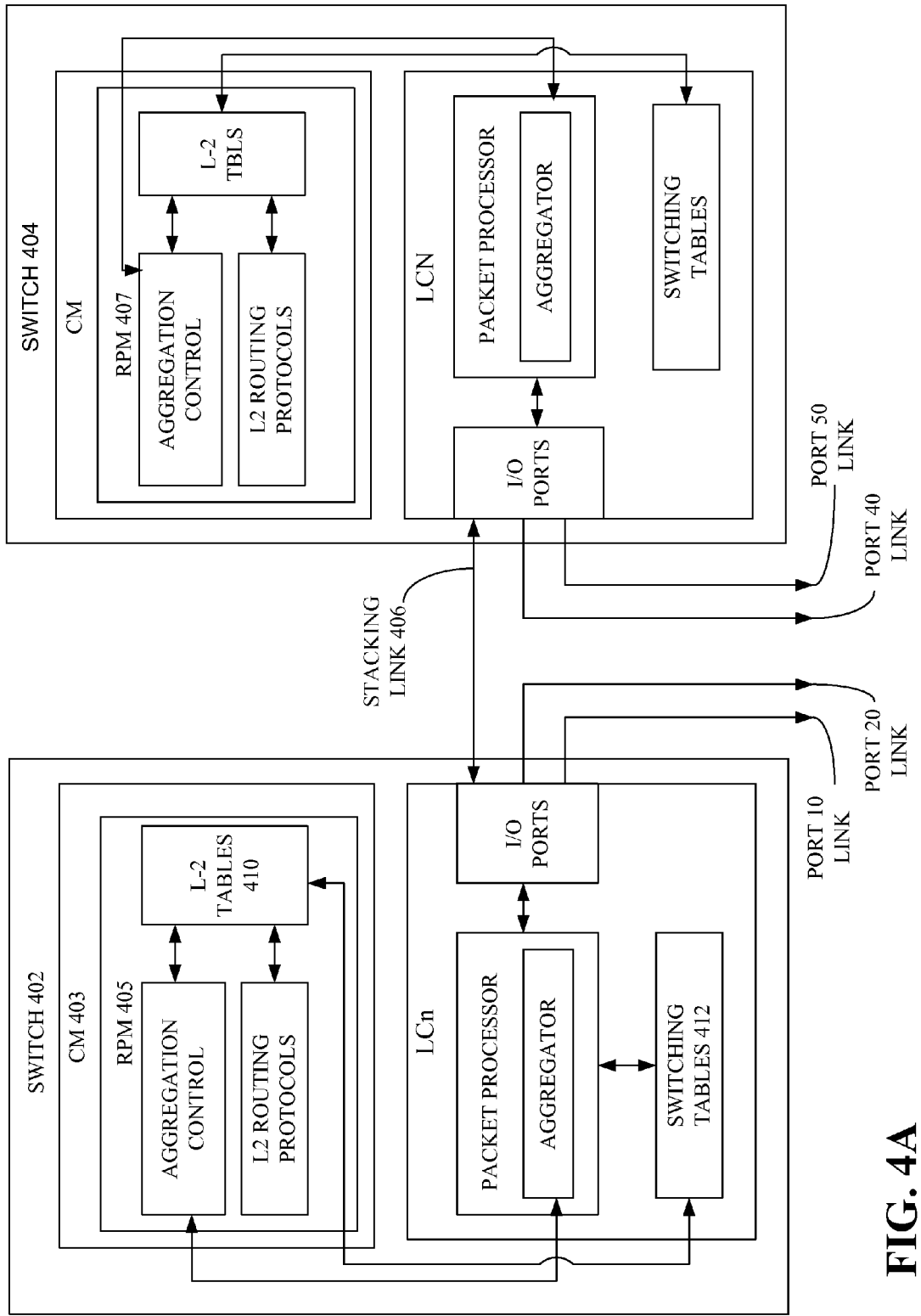
FIG. 4A is a diagram of a stacking switch 400

FIG. 4A is a diagram showing a stacked switch 400 that is comprised of two switches 402 and 404 that communicate with each other over a stacking link 406. Each of the switches 402 and 404 include, among other things, all of the functionality in the switches 100 and 102 described earlier with reference to FIG. 1. Switch 402 is shown to include two I/O ports, 10 and 20, and switch 404 is shown with two I/O ports, 40 and 50. It should be understood that although each switch is capable of being configured with many more ports, for the purpose of this description, only two ports on each switch are illustrated. Also, the stacked switch 400 is configured with two link aggregation groups (LAGs), LAG 10 and LAG 20. The port 10 on switch 402 and port 40 on switch 404 are members of LAG 10 and port 20 on switch 402 and port 50 on switch 404 are members of LAG 20. These LAGs are configured and maintained in the stacked switch 400 by the Link Aggregation Sublayer 220 described earlier with reference to FIG. 2. Specifically, each of the LAGs 10 and 20 are configured in the aggregation control functionality that is included in both of the switches 402 and 404 comprising the stacked switch 400. Typically, all of the information associated with LAG state variables is included in memory (L2 tables) located in an RPM, such as RPM 405 and RPM 407 in switches 402 and 404 respectively of the stacked switch 400. This state variable information can typically include, among other things, a LAG ID to which a port or link associated with the port belongs, the ID of the aggregator associated with an LAG, the status of the interaction between the frame collection function and the frame distribution function of the aggregator and a link. In order for the stacked switch 400 to forward network information (packets/frames) it receives to a destination over either of the LAGs 10 or 20, it is necessary to configure switching tables in the line cards of the stacked switch with at least some of the LAG state variables stored in memory and information gathered as the result of running the layer-2 routing protocol(s) and stored in the L2 tables.

FIG. 4B shows an example of L2 tables, such as the L2 tables in RPMs 405 and 407 of FIG. 4A, that includes two tables, namely a MAC table and a LAG table. The LAG table includes LAG state variable information configured by a systems administrator and it includes information learned as the result of running the well known link aggregation control protocol (LACP). The MAC table includes information learned by the switch (Packet Processor on switch 402 for instance) using data frame MAC learning protocol. Specifically, the MAC table entries can include, among other things, one or more MAC destination addresses (DA), the identify of one or more VLANs and the identities of one or more egress ports. In this case, the table entries associated with the egress port IDs are populated with the identify of one or more LAGs (LAG-10 and LAG-20-LAG-N). The LAG table can include, among other things, the identity of one or more LAGs, the number of ports that are members of each of the LAGs, a listing of the port identities that are members of each LAG and the identify of an aggregator to which the ports in a LAG are bound. Selected information stored in the RIB can be used to build and maintain switching tables stored in a line card, such as the LC described with reference to FIG. 4A. Typically, the switching tables contain only a subset of the information stored in a L2 tables and these tables are designed to accommodate the very fast lookup of switching information.

FIG. 4C shows the format for a switching table such as the tables described with reference to FIG. 4A. Two tables comprising the switching table are shown, a MAC table and a LAG table. In this case, the MAC table includes entries for one or more MAC DAs, one or more VLAN.IDs and the identifies of one or more egress ports. The egress port entries are populated with the identity of one or more LAGs (LAG-10, LAG-20-LAG-N). It should be noted, that the identifies of each of the LAGs that the switch is configured to support is stored in both the L2 tables (maintained by the Link Aggregation sub-layer in the RPM) and the switching tables (maintained in the line cards). In normal operation, a packet ingressing to the switch, such as switch 402 in FIG. 4A, will typically include a MAC DA in its header, such as the MAC DA (AA:AA:AA:AA:AA:AA) in the MAC table of FIG. 4B. The packet processor in the line card of switch 402 detects the MAC DA and uses this information as a lookup key into the MAC table. In this case, the MAC DA identifies the egress port as LAG-10. The aggregator running in the packet processor on switch 402 uses this egress port information as a lookup key into the LAG table and identifies that either port 10 or port 40 can be selected as the port over which to transmit the packet. Normal selection methods (hash for instance) can then be used to transmit the packet out over either port 10 or 40.

As described earlier in the background section, memory space in a packet processor device that is dedicated to storing the switching tables is limited, and as a consequence, the size of the memory limits the number of LAGs that can be supported by the packet processor running in the line cards, and this limitation cannot be overcome by merely stacking multiple switches together.

In one embodiment, a LAG configured as the one described with reference to FIG. 4A, is configured in the link aggregation layer as described earlier in the background section, but the LAG is not programmed into the switching tables located in the line cards. Instead of including a switching table entry with the identity each of the LAGs of this particular type/configuration (which will be referred to here as a redundant LAG here), the table entries are populated with the identity of ports (on the same switch) on which the MAC DAs for the LAG are learned. In this case, the LAG tables comprising the switching table are not programmed to include any information relating to a redundant LAG.

Referring again to the stacked switch configuration of FIG. 4A, and according to one embodiment, a switching table in a line card can be programmed as shown with reference to FIG. 5. This Figure illustrates the format and contents of two switching tables, table 500 and table 501, which can be maintained in the line cards of the switches 402 and 404 respectively. The table 500 included in switch 402 is comprised of a MAC table 510 and a LAG table 520. This MAC table can be configured in a manner that is similar to that of the switching tables described with reference to FIG. 4C, with the exception that there are no table entries programmed to include the identities of the redundant LAGs. In contrast to the switching table described with reference to FIG. 4C, table 500 entries are programmed to include the identity of the egress ports learned on switch 402 for traffic forwarded over this redundant LAG, which in this case are the two ports, port 10 and port 20. Programming the switching table 500 the identifies of an egress port as opposed to the identifies of a LAG causes the normal forwarding functionality on the line card to not employ (bypass) the aggregator functionality with respect to traffic egressing the switch over the relevant ports, which in this case are ports 10 and 20. All other non-redundant LAGs are programmed into the table in the normal manner. A switching table programmed in this manner preserves memory space for the support of other non-redundant LAGs, and so effectively increases the number of LAGs that can be configured in a switch. Further, the L2 tables located in the RPM 405 of switches 402 includes all of the information used to build and maintain the table 500, and they are programmed in the normal manner as described earlier with reference to FIG. 4B.

Continuing to refer to FIG. 5, the Switching Table 501 included in switch 404 is comprised of a MAC table 530 and a LAG table 540. The MAC table can be formatted in a manner that is similar to that of the switching tables described with reference to FIG. 4C, with the exception that the egress port entries associated with the redundant LAGs are programmed with the identity of the egress port learned on the same switch, switch 404, in which the table is stored. Accordingly, the identities of port 40 and port 50 are programmed into the MAC table, and the identifies of the regular or non-redundant LAGs are programmed into the MAC table entries in the normal manner. Further, the L2 tables located in the RPM 407 of switch 404 respectively, includes all of the information used to build and maintain the table 501, and they are programmed in the normal manner as described earlier with reference to FIG. 4B.

In operation, switch 402 or 404 can operate, using the switching tables described earlier with reference to FIG. 5, as follows. A packet ingressing to a switch, such as switch 402, on port 20 and having a MAC DA of (AA:AA:AA:AA:AA:AA), is processed by the packet processor in the line card which detects the MAC DA, and uses this as a lookup key into Table 500. The MAC DA in this case points to a table entry that includes the identity of egress port 10, and the packet is switched out on this port. According to this embodiment, each of the switches 402 and 404 comprising the stacked switch 400 include source suppression logic that operates to prevent packets, ingressing at each of the switches 402 and 404, from being transmitted to their destination over the same port. Source suppression as it relates to network switches is well known to practitioners and so will not be described here. As with the operation of switch 402, switch 404 operates on packets ingressing to it on a port (port 40), that is under the control of link aggregation functionality running in the RPM, to transmit the packet back out on the other port on the switch (port 50) that is also under control of the same LAG.

In another embodiment, and according to the stacking arrangement described with reference to FIG. 4, in order to prevent multiple copies of multicast or flooding traffic from being transmitted by each of the stacked switches 402 and 404, a block can be configured in each switch such that that packets ingressing over the stacking link to either of the switches 402 or 404, are not transmitted over ports that are members of a redundant LAG. So for instance, a packet that is flooded to each of the ports associated with switch 404 will ingress to switch 402 over the stacking link 406 of FIG. 4. Since this packet will be transmitted to it proper destinations by switch 404, there is no need for switch 402 to also transmit the packet to its proper destinations. As this is the case, a block is placed on the ports that are members of the redundant LAG configured on switch 402 that prevents traffic flooding into the switch from being egressing on any of the members of the redundant LAG (ports 10 and 20 in this case). Such a block can be implemented by configuring the switching tables in switch 402 with an access control list or some other well known blocking method.

According to the redundant LAG configuration described with reference to FIG. 5 and the stacked switch 400 of FIG. 4, in the event that a port (port 50 for instance) on switches 404 fails, then traffic ingressing on port 40 can be redirected (MAC table learns egress port associated with stacking link 406 and this is programmed into the switching table in other words, a port associated with the stacking link is configured to be a member of the redundant LAG on switch 404) to egress the switch over the stacking link 406. In order for a packet ingressing to switch 402 from switch 404 to be switched through the switch 402, it is necessary to disable the block configured on each port (port 10 and 20) that are members of the redundant LAG configured on switch 402.

The forgoing description, for purposes of explanation, uses specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of forwarding a packet in a network switch comprising a logical switch configuration, the method comprising:
    receiving a packet by a network switch on a port that is a member of a first redundant link aggregation group (LAG);
    detecting a Media Access Control Destination Address (MAC DA) in a header of the packet, wherein the MAC DA is associated with a second redundant LAG;
    using the MAC DA as a lookup key into a switch table maintained on the network switch to identify an egress port that is on that network switch, wherein the egress port is a member of the second redundant LAG, and wherein the switch table does not include the identity of the first redundant LAG or the second redundant LAG but does include the identity of one or more non-redundant LAGs; and
    forwarding the packet over the identified egress port.

2. The method of claim 1, wherein the network switch is one of two more network switches in a stacked switch configuration.

3. The method of claim 1, wherein each of the first redundant LAG and the second redundant LAG are included on at least two network switches in a stacked switch configuration, and wherein each network switch includes only one port that is a member of the first redundant LAG and the second redundant LAG.

4. The method of claim 1, wherein the switch table maintained on the network switch is comprised of a MAC DA table.

5. The method of claim 1, wherein the first redundant LAG and the second redundant LAG are configured in an instance of an aggregation control function associated with the network switch.

6. A method of forwarding a packet in a network switch comprising a logical switch configuration, the method comprising:
    receiving a packet by a network switch on a port;
    detecting a Media Access Control Destination Address (MAC DA) in a header of the packet, wherein the MAC DA is associated with a redundant link aggregation group (LAG);
    using the MAC DA as a lookup key into a switch table maintained on the network switch to identify an egress port that is on that network switch, wherein the egress port is a member of the redundant LAG, and wherein the switch table does not include the identity of the redundant LAG but does include the identity of one or more non-redundant LAGs; and
    forwarding the packet over the identified egress port.

7. The method of claim 6, wherein the network switch is one of two more network switches in a stacked switch configuration.

8. The method of claim 6, wherein the redundant LAG is included on at least two network switches in a stacked switch configuration, and wherein each network switch includes only one port that is a member of the redundant LAG.

9. The method of claim 6, wherein the switch table maintained on the network switch is comprised of a MAC DA table.

10. The method of claim 6, wherein the redundant LAGs is configured in an instance of an aggregation control function associated with the network switch.

11. A logical network switch, comprising:
    a first network switch and a second network switch configured in a stacked relationship with respect to each other, each switch including:
        a control module; and
        at least one line card with one or more ports, wherein only a port on each switch is configured to be a member of a redundant link aggregation group (LAG), and wherein each of the network switches is operable to:
            detect Media Access Control Destination Address (MAC DA) information in a ingressing packet and use the MAC DA information as a key to look up the identity of an egress port that is stored in switch table memory, wherein the egress port is a member of the redundant LAG, and wherein the switch table memory does not include the identity of the redundant LAG but does include the identity of one or more non-redundant LAGs; and
            forward the packet over the identified egress port.

12. The logical network switch of claim 11, wherein each of the network switches includes a packet processor.

13. The logical network switch of claim 11, wherein the switch table memory is comprised of a MAC DA table.

14. The logical network switch of claim 11, wherein the egress port over which the packet is forwarded is located on the same switch that received the ingressing packet.

* * * * *